United States Patent [19]
Nagasaka et al.

[11] Patent Number: 5,671,079
[45] Date of Patent: Sep. 23, 1997

[54] SCANNING LENS SYSTEM

[75] Inventors: Yasushi Nagasaka, Gamagoori; Hiromu Nakamura; Satoru Ono, both of Toyokawa, all of Japan

[73] Assignee: Minolta Co., Ltd., Osaka, Japan

[21] Appl. No.: 514,268

[22] Filed: Aug. 11, 1995

[30] Foreign Application Priority Data

Aug. 19, 1994 [JP] Japan ................................. 6-195256

[51] Int. Cl.⁶ ................................................ G02B 26/08
[52] U.S. Cl. ......................... 359/205; 359/206; 359/207; 347/258
[58] Field of Search .................................. 359/205, 206, 359/207, 215, 216, 217, 218, 219; 347/137, 256, 258, 259

[56] References Cited

U.S. PATENT DOCUMENTS

| | | | |
|---|---|---|---|
| 4,443,055 | 4/1984 | Matsuoka et al. | 359/218 |
| 5,111,219 | 5/1992 | Makino | 347/259 |
| 5,189,546 | 2/1993 | Iizuka | 359/217 |
| 5,557,446 | 9/1996 | Kato | 359/206 |

FOREIGN PATENT DOCUMENTS 0566132  4/1993  European Pat. Off. .

*Primary Examiner*—Paul M. Dzierzynski
*Assistant Examiner*—Darren E. Schuberg
*Attorney, Agent, or Firm*—Price, Gess & Ubell

[57] ABSTRACT

A scanning lens system forms into an image a deflected beam having its object point in the main scanning direction located at a finite distance to scan a scanned surface. The fourth surface is parallelly decentered in the main scanning direction relative to the optical axis passing the center of a main scanning direction scanning width on the scanned surface. The third and fourth surfaces are rotatively decentered relative to the optical axis about an axis parallel to the sub scanning direction.

10 Claims, 18 Drawing Sheets

SCANNING LENS SYSTEM

BACKGROUND OF THE INVENTION

1. Field of the Invention

The present invention relates to a scanning lens system, and more specifically, to a scanning lens system for use in a laser beam scanning optical system.

2. Description of the Prior Art

In a scanning optical system, the point of reflection (i.e. point of deflection) at a polygonal mirror moves with a variation in angle of view (i.e. angle of deflection) in the main scanning direction. Such a movement of the point of deflection varies the object point distance in the sub scanning direction, so that the image plane in the sub scanning direction inclines. To correct this, U.S. Pat. No. 5,189,546 discloses an fθ lens having a toric surface parallelly decentered in the main scanning direction.

On the other hand, to reduce the size of the entire scanning optical lens system by decreasing the distance from the scanning optical system to a scanned surface, U.S. Pat. No. 5,111,219 discloses a scanning lens system which forms into an image on the scanned surface a deflected beam having its object point in the main scanning direction (i.e. natural convergent point of a beam when no scanning lens system is provided) located at a finite distance to scan the scanned surface with the beam (this scanning lens system will hereinafter be referred to as "finite object point scanning lens system).

According to U.S. Pat. No. 5,189,546, since a parallel beam is incident on the fθ lens (i.e. the object point in the main scanning direction is located at an infinite distance), the above-mentioned movement of-the point of deflection does not vary the object point distance in the main scanning direction. Consequently, the performance of scanning (field curvature and distortion) in the main scanning direction is not affected by the movement of the point of deflection. According to U.S. Pat. No. 5,111,219, since the object point in the main scanning direction is located at a finite distance, the movement of the point of deflection affects the performance of scanning in the main scanning direction.

SUMMARY OF THE INVENTION

An object of the present invention is to provide a finite object point scanning lens system where field curvatures in the main and sub scanning directions and distortion are excellently corrected.

To achieve the above-mentioned object, in a scanning lens system of the present invention which forms a light beam deflected by a deflector into an image on a scanned surface to scan the scanned surface with the light beam, said light beam having its object point in a main scanning direction located at a finite direction, said scanning lens system includes a surface rotatively decentered about an axis parallel to a sub scanning direction relative to a reference axis passing a center of a main scanning direction scanning width on the scanned surface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

A scanning lens system of the present invention forms into an image on a scanned surface a deflected beam having its object point in the main scanning direction located at a finite direction to scan the scanned surface with the beam. The scanning optical system has a surface rotatively decentered about an axis parallel to the sub scanning direction relative to a reference axis passing the center of the main scanning direction scanning width on the scanned surface.

Alternatively, the scanning lens system of the present invention has a surface parallelly decentered in the main scanning direction relative to the center of the main scanning direction scanning width on the scanned surface and a surface rotatively decentered relative to the reference axis about an axis parallel to the sub scanning direction.

Hereinafter, the parallel decentering (FIGS. 2A and 2B) and the rotative decentering about the axis parallel in the sub scanning direction (FIGS. 3A and 3B) will be described.

Figure 2A:
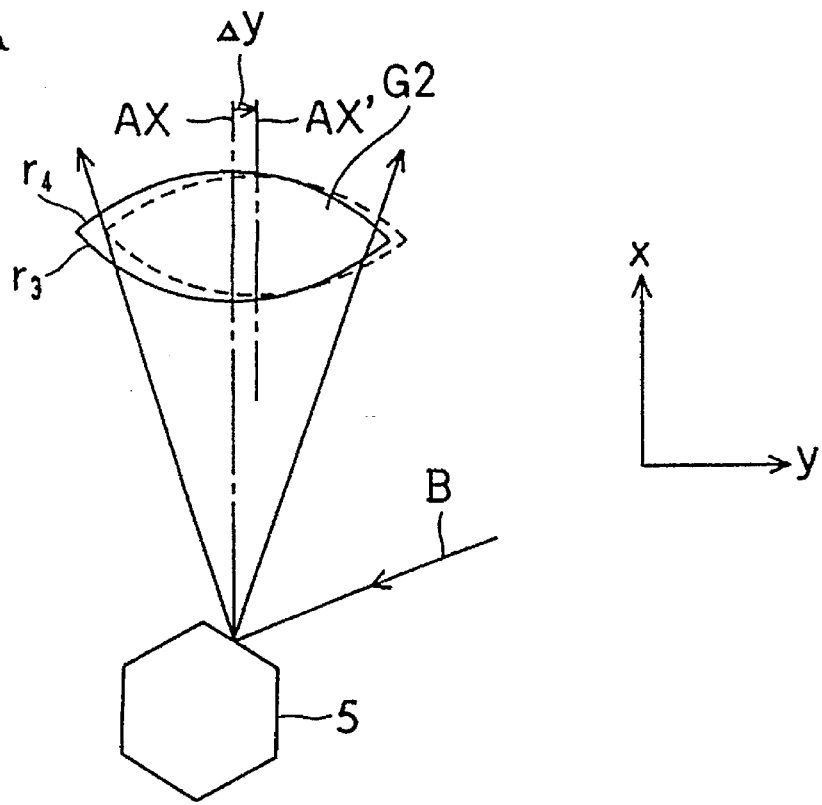
FIGS. 2A and 2B are views of assistance in explaining parallel decentering of the scanning lens system of the present invention.
Figure 2B:
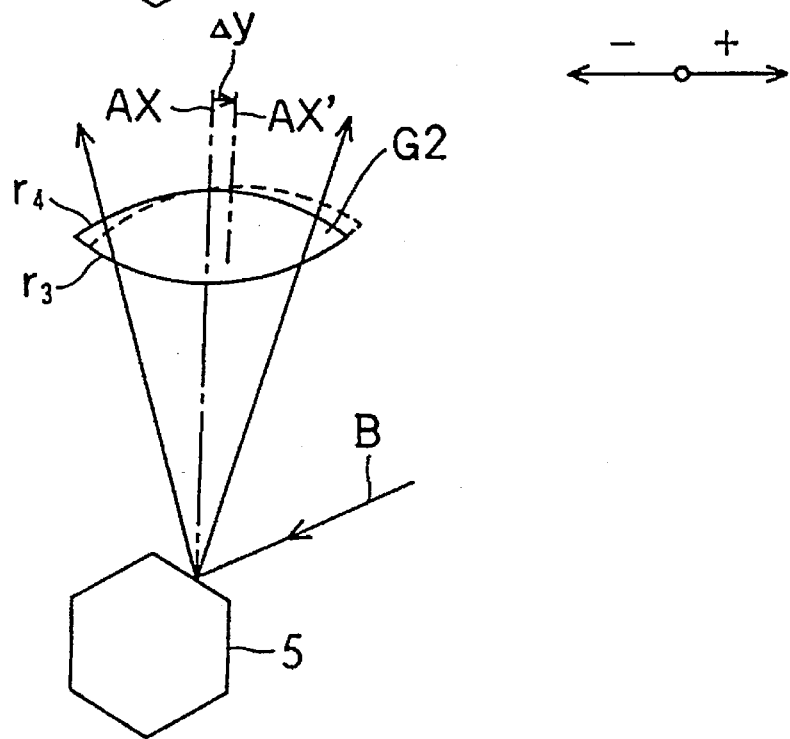

The parallel decentering has the following types: a parallel decentering (hereinafter, referred to as "lens block parallel decentering") in which, as shown in FIG. 2A, a part (e.g. a first lens element G1 and a second lens element G2) of the lens elements constituting the scanning lens system or the entire scanning lens system is moved in lens blocks in the main scanning direction relative to the reference axis passing the center of the main scanning direction scanning width on the scanned surface; and a parallel decentering (hereinafter, referred to as "only surface parallel decentering") in which, as shown in FIG. 2B, only one surface of a lens element included in the scanning lens system is moved in the main scanning direction relative to the reference axis passing the center of the main scanning direction scanning width on the scanned surface. The parallel decentering of the present invention includes both of these types. The lens block parallel decentering is, in other words, a both surface parallel decentering in which both surfaces of the lens elements included in the scanning lens system are moved in the main scanning direction relative to the reference axis passing the center of the main scanning direction scanning width on the scanned surface. In FIGS. 2A and 2B, the parallel decentering to the right is a decentering in the positive direction and represented by a positive displacement amount, and the parallel decentering to the left is a decentering in the negative direction and represented by a negative displacement amount.

The parallel decentering will be described in more detail. Assuming that the scanning lens system consists of two lens elements, that the beam admitting surface of the second lens element G2 is a third surface $r_3$, that the image side surface thereof is a fourth surface $r_4$, and that only the lens element G2 is lens-block-parallel-decentered. In this case, as shown in FIG. 2A, relative to the reference axis AX (i.e. the optical axis of the scanning lens system) passing the center of the main scanning direction scanning width on the scanned surface, only the second lens element G2 is moved in the main scanning direction (in the y direction), i.e. the third and fourth surfaces $r_3$ and $r_4$ are both parallelly moved (shown by the broken line in the figure; AX' represents the optical axis of the second lens element G2 and $\Delta y$ represents a surface shift amount).

Figure 16:
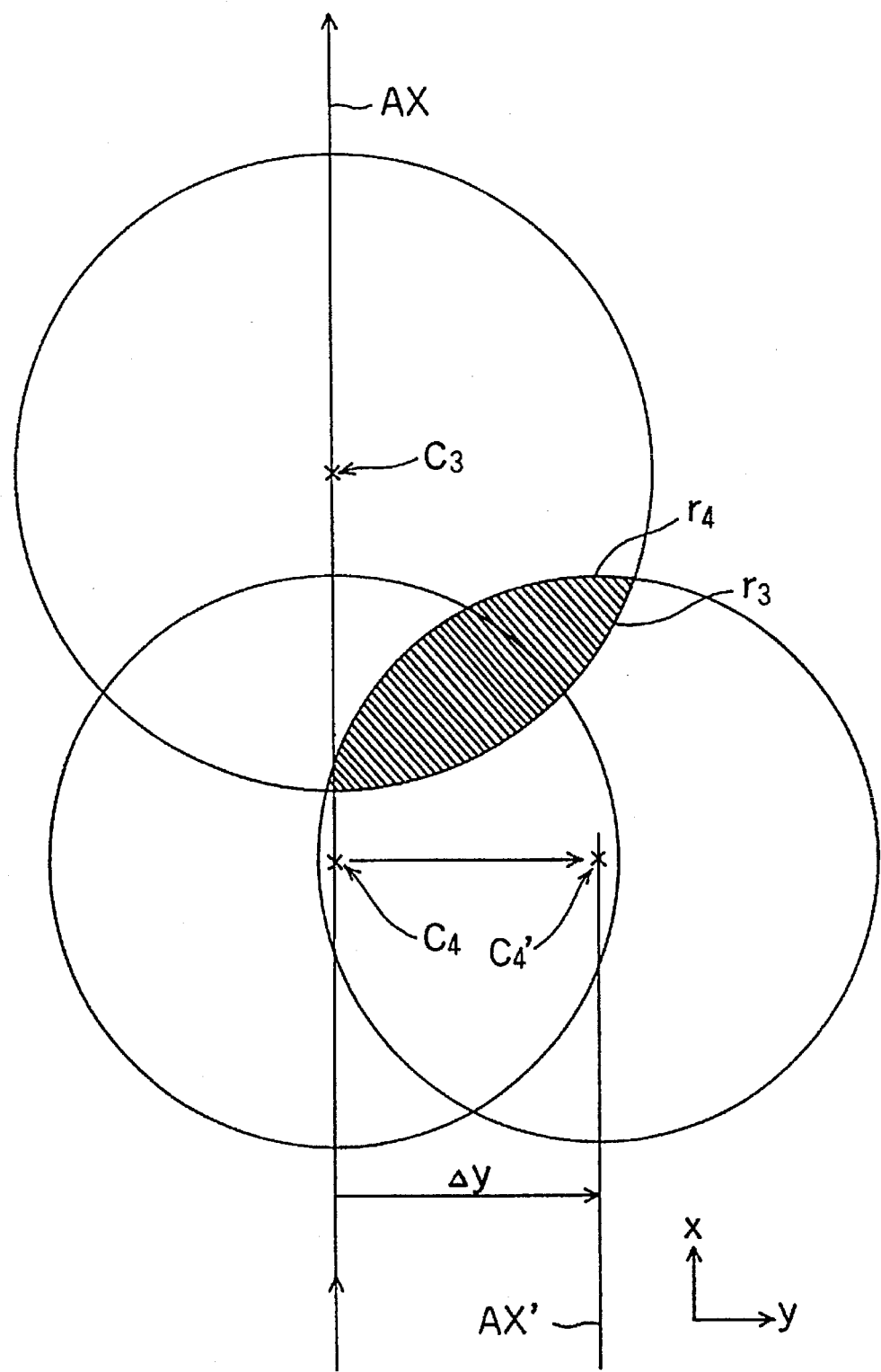
FIG. 16 is a view of assistance in explaining the only surface parallel decentering in the present invention.

On the contrary, when it is assumed that only the fourth surface $r_4$ is only-surface-parallel-decentered, as shown in FIG. 2B, only the fourth surface $r_4$ is parallelly moved in the main scanning direction (shown by the broken line in the figure) relative to the optical axis AX of the scanning lens system (AX' represents the central axis of the fourth surface $r_4$ and $\Delta y$ represents a surface shift amount). FIG. 16 shows a relationship between the circles constituting the surfaces $r_3$ and $r_4$ and the positions $C_3$, $C_4$, $C_4'$ of their centers of curvature under this condition. From FIG. 16, it is apparent that the center of curvature of the fourth surface $r_4$ is moved by $\Delta y$ from the position $C_4$ to the position $C_4'$.

Figure 3A:
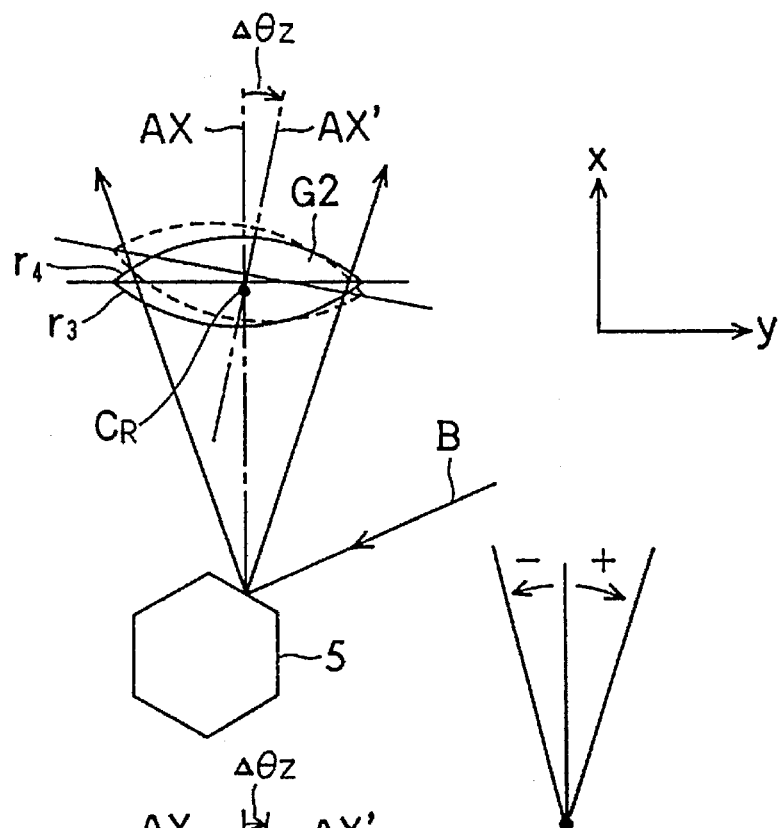
FIGS. 3A and 3B are views of assistance in explaining a rotative decentering about an axis parallel to the sub scanning direction of the scanning lens system of the present invention.
Figure 3B:
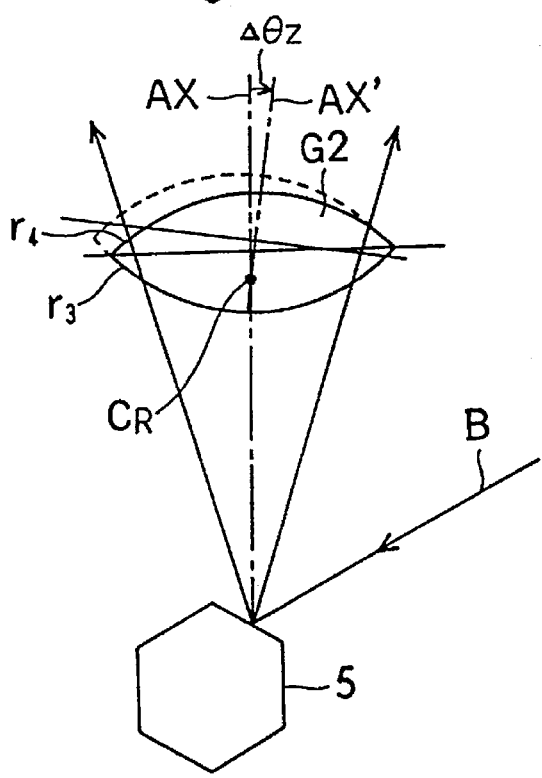

The rotative decentering about the axis parallel to the sub scanning direction has the following types: a rotative decentering (hereinafter, referred to as "lens block rotative decentering") in which, as shown in FIG. 3A, a part (e.g. the first lens element G1 and the second lens element G2) of the lens elements constituting the scanning lens system or the entire scanning lens system is rotated in lens blocks about the axis parallel to the sub scanning direction (direction vertical to the plane of the figure) relative to the reference axis passing the center of the main scanning direction scanning width on the scanned surface; and a rotative decentering in which, as shown in FIG. 3B, only one surface of a lens element included in the scanning lens system is rotated about the axis parallel to the sub scanning direction relative to the reference axis passing the center of the main scanning direction scanning width on the scanned surface (hereinafter, referred to as "only surface rotative decentering"). The rotative decentering of the present invention about the axis parallel to the sub scanning direction includes both of these types. The lens block rotative decentering is, in other words, a rotative decentering of both surfaces in which both surfaces of a lens element included in the scanning lens system are rotated about the axis parallel to the sub scanning direction relative to the reference axis passing the center of the main scanning direction scanning width on the scanned surface. In FIGS. 3A and 3B, the clockwise rotative decentering is a decentering in the positive direction and represented by a positive displacement angle, and the counterclockwise rotative decentering is a decentering in the negative direction and represented by a negative displacement angle.

Figure 17:
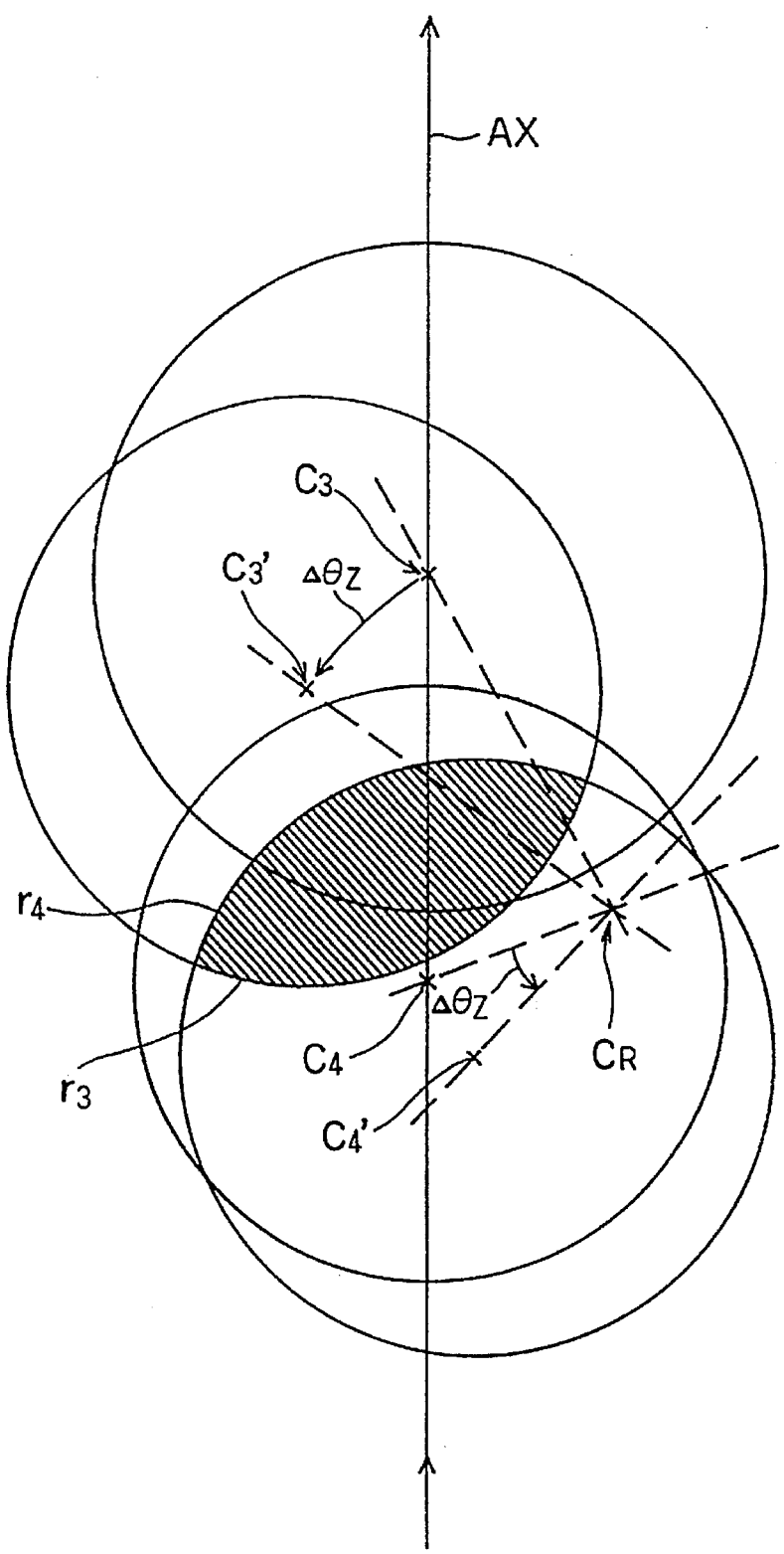
FIG. 17 is a view of assistance in explaining the lens block rotative decentering in the present invention.

The rotative decentering will be described in more detail. Assume that the scanning optical system includes two lens elements, that the beam admitting surface of the second lens element G2 is a third surface $r_3$, that the image side surface thereof is a fourth surface $r_4$, and that only the second lens element G2 is lens-block-rotative-decentered. In this case, as shown in FIG. 3A, relative to the optical axis AX of the scanning lens system, only the second lens element G2 is rotated about a rotation axis $C_R$ parallel to the sub scanning direction (direction vertical to the plane of the figure), i.e. the third and fourth surfaces $r_3$ and $r_4$ are both rotated (shown by the broken line in the figure; AX' represents the optical axis of the second lens G2 and $\Delta \theta_z$ represents a surface shift amount). FIG. 17 shows a relationship between the circles constituting the surfaces $r_3$ and $r_4$ and the positions $C_3$, $C_3'$, $C_4$, $C_4'$ of the centers of curvature under this condition. From FIG. 17, it is apparent that in the lens block rotative decentering, the centers of curvature of the surfaces $r_3$ and $r_4$ are moved by $\Delta \theta_z$ from the positions $C_3$ and $C_4$ to the positions $C_3'$ and $C_4'$, respectively.

Figure 18:
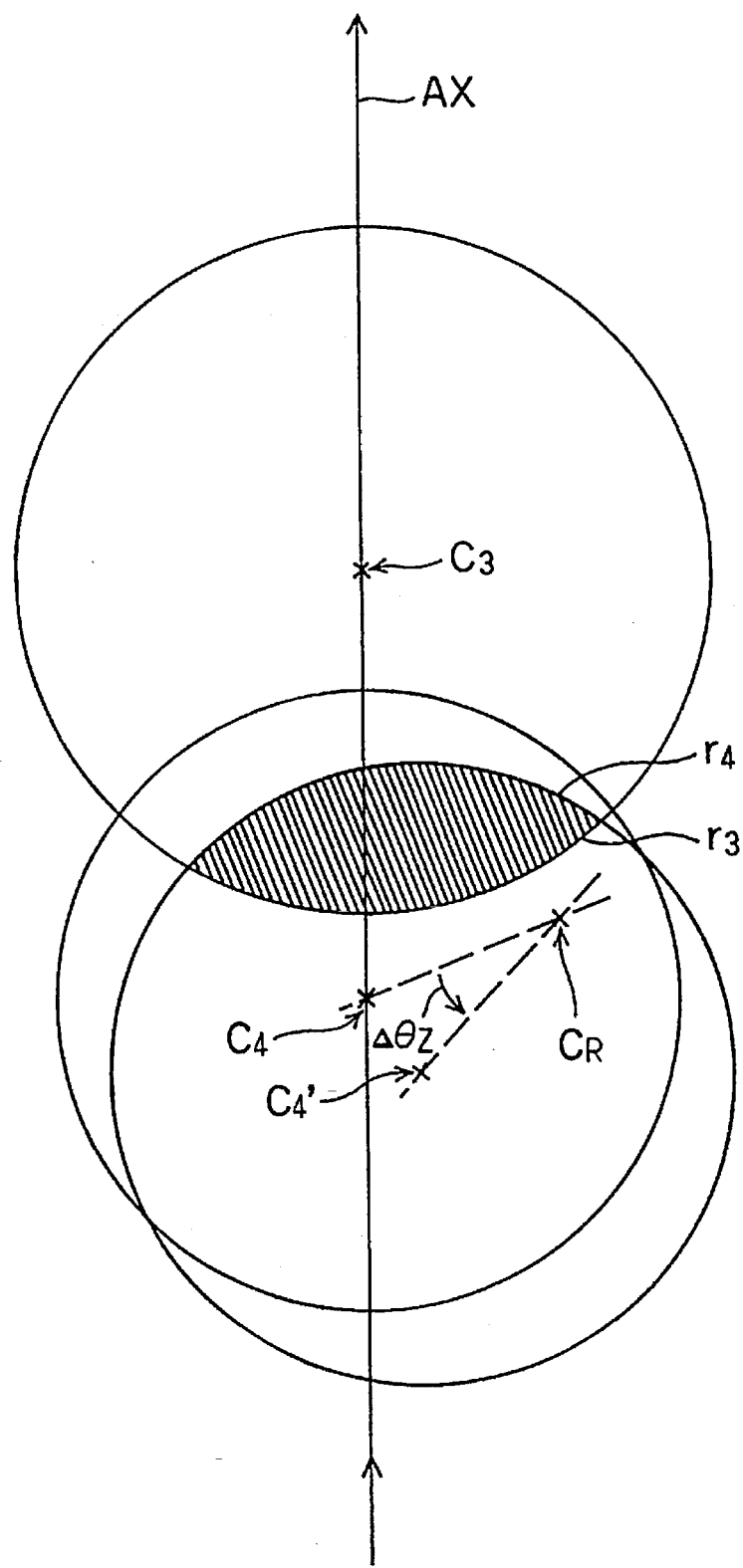
FIG. 18 is a view of assistance in explaining the only surface rotative decentering in the present invention.

On the contrary, when it is assumed that only the surface $r_4$ is only-surface-rotative-decentered, as shown in FIG. 3B, only the surface $r_4$ is rotated (shown by the broken line in the figure) about the rotation axis $C_R$ parallel to the sub scanning direction (AX' represent the central axis of the surface $r_4$ and $\Delta \theta_z$ represents a surface shift amount). FIG. 18 shows a relationship between the circles constituting the surfaces $r_3$ and $r_4$ and their centers of curvature under this condition. From FIG. 18, it is apparent that in the only surface rotative decentering, the center of curvature of the fourth surface $r_4$ is moved by $\Delta \theta_z$ from the position $C_4$ to the position $C_4'$.

The rotation axis $C_R$ for the rotative decentering should be located at a position other than the positions $C_3$ and $C_4$ of the centers of curvature of surfaces (the third and fourth surfaces $r_3$ and $r_4$ in FIG. 17, the fourth surface $r_4$ in FIG. 18) to be rotated. This is because if the rotation axis $C_R$ is set at the position $C_3$ of the center of rotation of the third surface $r_3$ in FIG. 17, the condition is the same as that of the only surface rotative decentering of FIG. 18, and if the rotation axis $C_R$ is set at the position $C_4$ of the center of curvature of the fourth surface $r_4$ in FIG. 18, the surface is not decentered.

The directions and amounts of variation in inclinations of field curvatures in the main and sub scanning directions and distortion vary according to the type of decentering such as the lens block decentering, the only surface decentering, the parallel decentering and the rotative decentering about the axis parallel to the sub scanning direction. When a surface is used which is rotatively decentered about the axis parallel to the sub scanning direction relative to the reference axis passing the center of the main scanning direction scanning width on the scanned surface, even if there is a movement of the point of deflection, distortion is shifted in a direction to be corrected while the variation in field curvature is restrained. When a surface parallelly decentered in the main scanning direction relative to the above-mentioned reference axis is combined therewith, field curvature in the main scanning direction and field curvature in the sub scanning direction are shifted in a direction to be corrected, so that the three aberrations are well balanced.

Hereinafter, an embodiment of a scanning lens system according to the present invention will be described. Data of the embodiment (subsequently-described scanning lens system SL) are shown in Tables 1 and 2. Data of a comparison (subsequently-described scanning lens system SL') are shown in Table 3. The comparison shown in Table 3 is a scanning lens system on which a parallel beam is incident, whereas the embodiment shown in Tables 1 and 2 is a scanning lens system on which a convergent beam is incident (i.e. finite object point scanning lens system). In the embodiment, a distance S1 from a polygonal reflecting surface (0th surface) to the object point in the main scanning direction is +210 mm. In Tables 1 and 3, the refractive indices are for a light beam with a wavelength of 780 nm.

Figure 15:
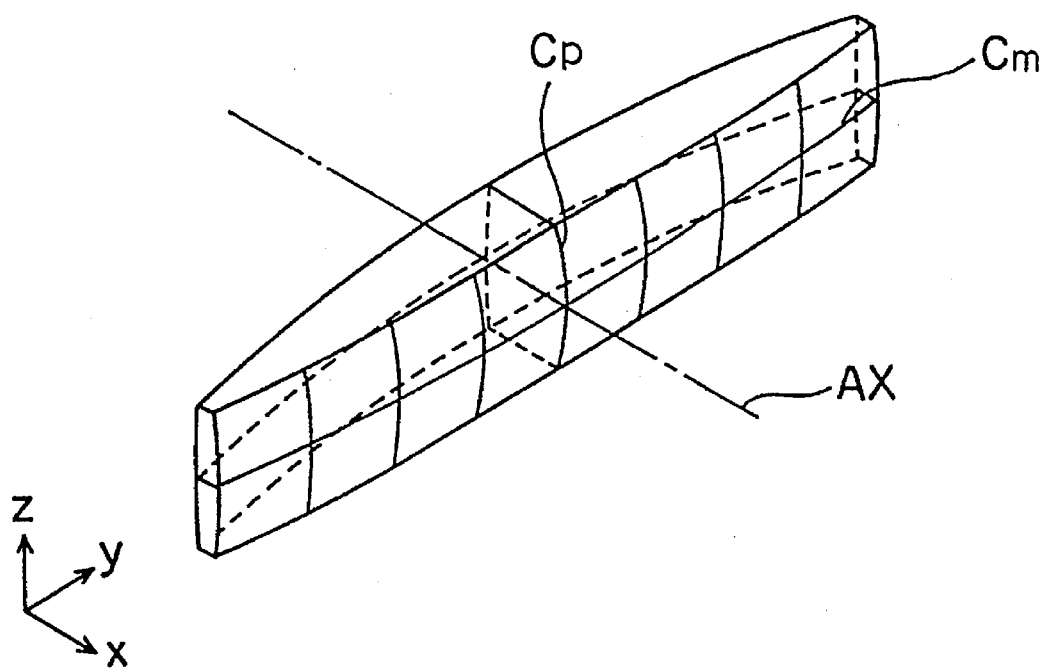
FIG. 15 is a view of assistance in explaining a deformed toric surface of the second lens element included in the embodiment of FIG. 1.

In the embodiment, the image side surface (fourth surface $r_4$) of the second lens G2 is a toric surface where the refractive power differs between in the main and sub scanning directions. The toric surface of the second lens element G2 will be described with an extended y toric surface as an example. As shown in FIG. 15, the cross section of this toric surface taken along the main scanning direction is aspherical, and the curvature in the sub scanning direction continuously varies along the main scanning direction cross section. This toric surface is defined as a function of y and z by the following expression (A):

$$x = \frac{\kappa \cdot z^2}{1 + (1 - \mu \cdot \kappa^2 \cdot z^2)^{\frac{1}{2}}} + \rho + A \quad (A)$$

where $$\kappa = \frac{K}{1 - K \cdot \rho} \quad (B)$$

$$\rho = \frac{c \cdot \xi^2}{1 + (1 - \epsilon \cdot c^2 \cdot \xi^2)^{\frac{1}{2}}} \quad (C)$$

$$\zeta = y - S \quad (D)$$

The extended y toric surface is obtained as a reference y toric surface to which a two-dimensional additive term A (y, z). When a curve on the main scanning direction cross section is a main curve $C_m$ and a curve on the sub scanning direction cross section is a profile curve $C_p$ (i.e. x represents a direction along the optical axis, y represents the main scanning direction, and z represents the sub scanning direction). K and c respectively represent curvatures along the main curve and the profile curve at the vertex (to be exact, these represent $K+2a_{0,2}$ and $c+2a_{2,0}$, respectively) (i.e. 1/K is a vertex radius of curvature of the main curve $C_m$ and 1/c is a radius of curvature of the profile curve $C_p$ (radius of curvature at the vertex of the main curve $C_m$ in the sub scanning direction), and μ and ε respectively represent conic constants of a main curve direction and a profile curve direction (hyperbola when negative, parabola when zero, elliptic when positive, and circular when one).

For example, when μ=1 and S=0 and A=0, the expression (A) represents a conventional toric surface (secondary profile curve ρ rotated about an axis parallel to the y axis with a radius of 1/K). S and A in the expression (A) are represented by the following expressions 1 and 2:

$$S = \frac{c_s \cdot z^2}{1 + (1 - \mu \cdot c_s^2 \cdot z^2)^{\frac{1}{2}}} + \sum_{j=2}^{8} S_j \cdot |y|^j \quad \text{Expression 1}$$

$$A = \sum_{i=0}^{16} \left[ \sum_{j=0}^{8} a_{i,j} \cdot |z|^j \right] \cdot |\zeta|^i \quad \text{Expression 2}$$

In the expression 2,
$a_{0,0} \equiv 0$;
$a_{i,i} \equiv 0$; and
$a_{i,j} \equiv 0$.

In the embodiment, a surface formed of a rotationally symmetrical aspherical surface is defined by the following expression 3 representing the configuration of an aspherical surface:

$$X = \frac{C \cdot Y^2}{1 + (1 - \epsilon \cdot Y^2 \cdot C^2)^{\frac{1}{2}}} + \sum_i A_i Y^i \quad \text{Expression 3}$$

where X is an axial displacement amount from a reference surface, Y is a height in a direction vertical to the optical axis, C is a paraxial curvature, ε is a conic constant, and Ai is an ith aspherical coefficient (i=4, 6, 8, and 12).

Figure 12:
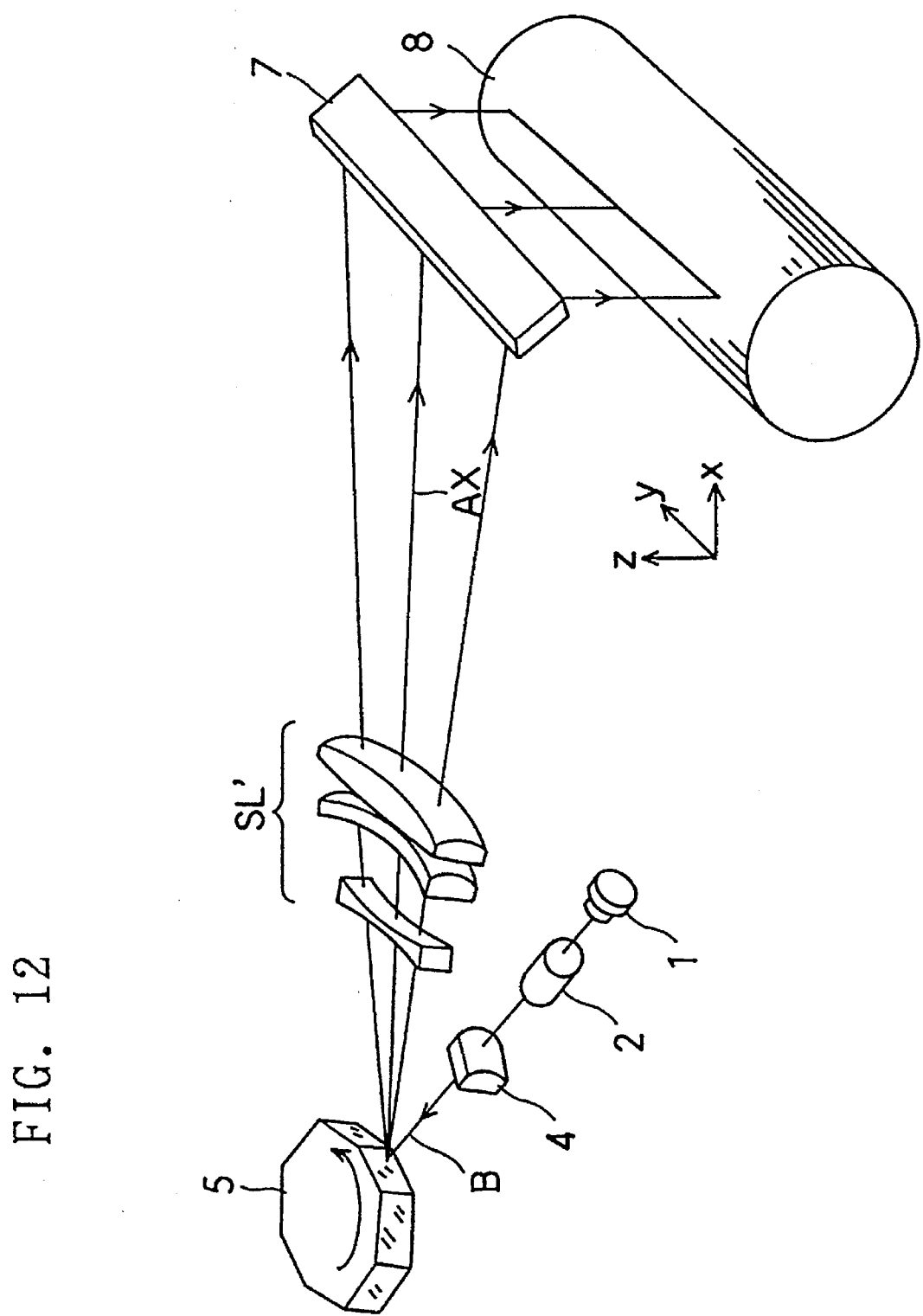
FIG. 12 is a perspective view of a conventional laser beam optical system employing the embodiment of FIG. 1.

Referring to FIG. 12, there is shown the general arrangement of a conventional laser scanning apparatus. The laser scanning apparatus is provided with a deflector 5 and a scanning lens system SL' which forms into an image on a scanned surface 8 a beam deflected by the deflector 5 in such a manner that scanning is performed at a constant angular velocity to scan the scanned surface 8 substantially at the constant speed. This will more specifically be described. A beam B emitted from a light source 1 formed of a semiconductor laser is incident on a condenser lens 2 and a cylindrical lens 4 and the beam B having exited from the cylindrical lens 4 is incident on the deflector (polygonal mirror) 5. The beam B deflected to perform scanning at a constant angular velocity by the deflector 5 rotating at a high speed (about an axis parallel to the sub scanning direction) is incident on the scanning lens system SL'. The beam B is made uniform on the image surface (scanned surface on the photoreceptor drum) by the scanning lens system SL' to scan the scanned surface 8 substantially at a constant speed. The scanning lens system SL' is the comparison (Table 3). Likewise, the scanning lens system SL of the present invention (Tables 1 and 2) is used being incorporated in the laser scanning apparatus.

Figure 1:
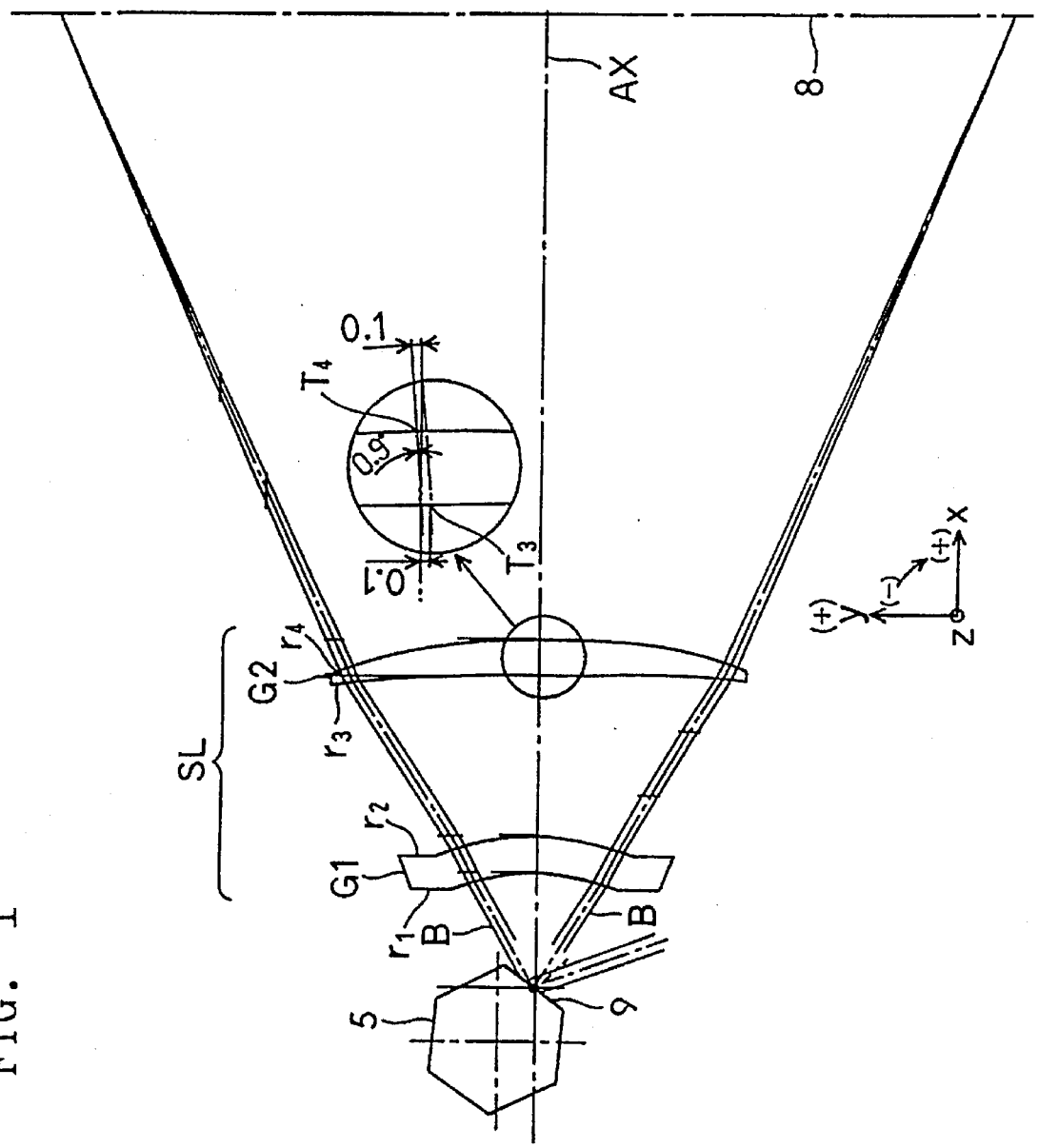
FIG. 1 is a cross-sectional view taken along a main scanning direction, showing a schematic arrangement of a scanning optical system provided with a scanning lens system embodying the present invention.

Subsequently, characteristics of the scanning lens system SL will be described. Referring to FIG. 1, there is shown the main scanning direction cross section of a scanning optical system employing the scanning lens system SL. As is apparent from FIG. 1 and the construction data of Table 1, the scanning lens system SL includes from the side of the deflector 5 a first lens element G1 of a negative refractive power and a second lens element G2 of a positive refractive power. These lens elements are both made of resin. While the first lens element G1 is formed to be axially symmetrical, the fourth surface $r_4$ of the second lens element G2 is an extended y toric surface having different refractive powers (i.e. having different radii of curvature) between in the main scanning direction and in the sub scanning direction. The scanning lens system SL forms into an image on the scanned surface 8 a deflected beam having its object point in the main scanning direction (y direction) located at a finite distance to scan the scanned surface with the beam B. That the object point in the main scanning direction is located at a finite distance means that the beam B incident on the scanning lens system SL is converged or dispersed in the main scanning direction.

The scanning lens SL is characterized in having a decentered surface. Hereinafter, the behaviors of scanning performances (distortion, and field curvatures in the sub and main scanning directions) of the embodiment and the comparison obtained when a decentered surface is provided will be described, and what kind of decentering adjustment is necessary in a scanning lens system on which a convergent beam is incident will be described.

Figure 4:
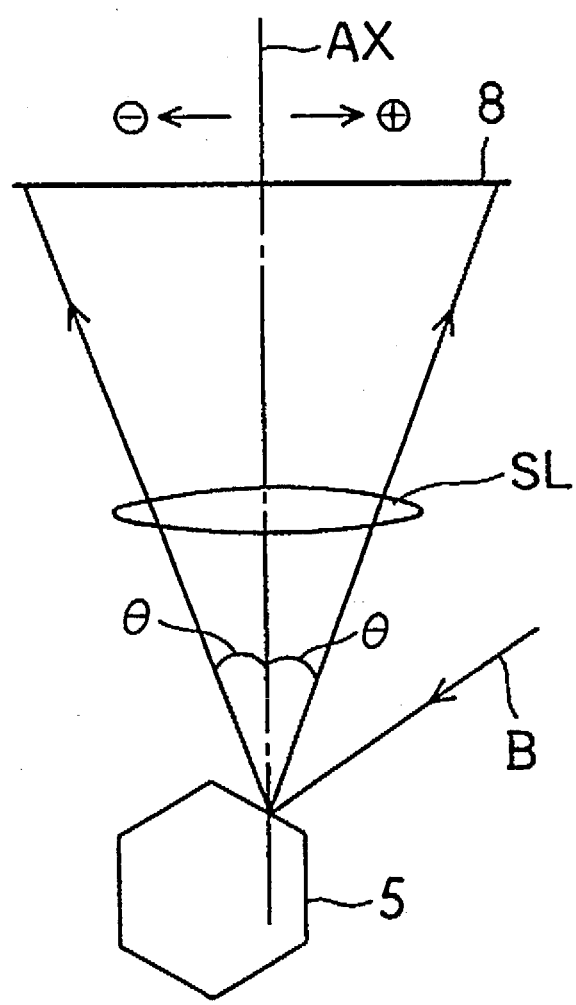
FIG. 4 is a view of assistance in explaining an angle of deflection in the scanning lens system of the present invention.

First, in the aberration representations of FIGS. 5A to 5C, 6A and 6B through 10A and 10B and 11 showing scanning performances, the axis of abscissas and the right and left axes of ordinates are defined as follows: The axis of abscissas represents an angle at which an optical axis AX of the scanning lens systems SL and SL' of the lens construction of Tables 1 to 3 and the beam B used for scanning intersect (i.e. an angle of view corresponding to an angle of deflection). This is scaled in degrees. Regarding the positive and negative, as shown in FIG. 4, the side where the incident beam B is deflected at a small angle is the positive side and the side where the beam B is deflected at a large angle is the negative side. The right axis of ordinates represents the amount of distortion of the beam B on the evaluation surface 8 at an angle of deflection θ (the difference between an ideal image height and an actual image height in the main scanning direction). This is scaled in percents. The left axis of ordinates represents the amount of field curvature of the beam B on the evaluation surface 8 at the angle of deflection θ (the difference between the positions of ideal and actual image planes). This is scaled in millimeters. In the aberration representations, a solid line $C_S$ represents field curvature in the sub scanning direction, a broken line $C_M$ represents field curvature in the main scanning direction, and a chain double-dashed line D represents distortion. The relationship between positive and negative in decentering is as described above.

Figure 5A:
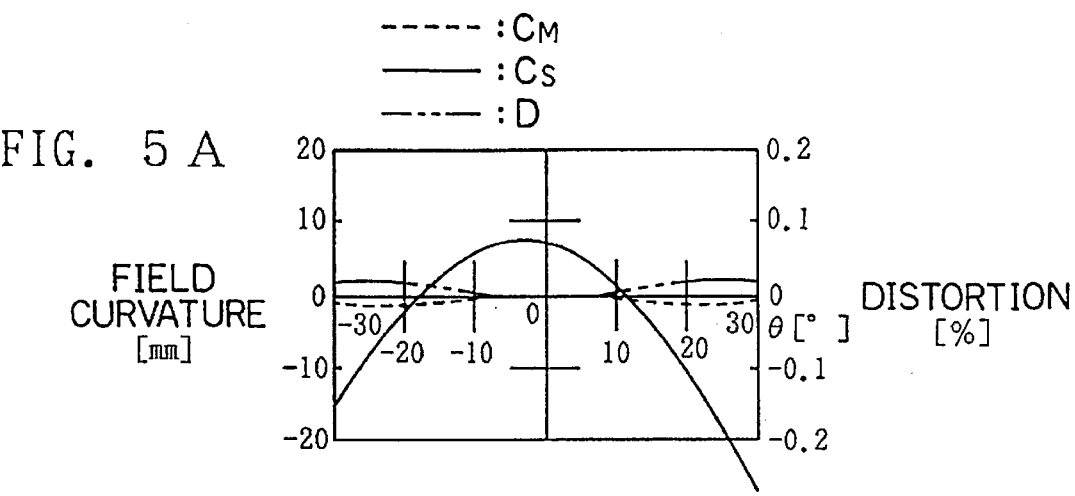
FIGS. 5A to 5C are aberration representations showing scanning performances of a conventional scanning lens system (fθ lens on which a parallel beam is incident)
Figure 5B:
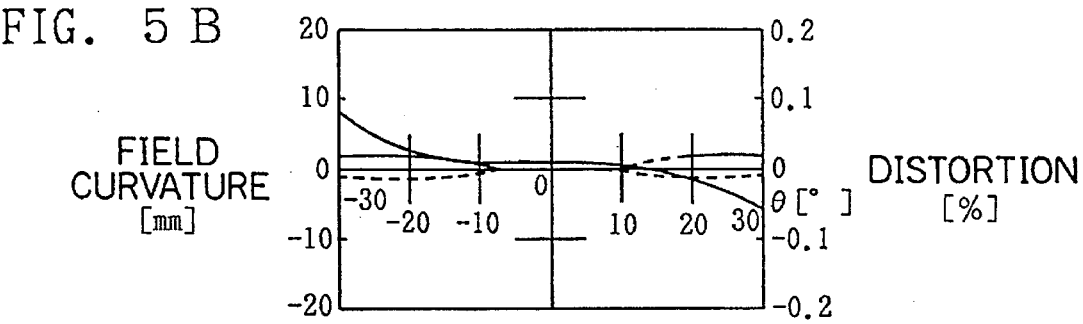
Figure 5C:
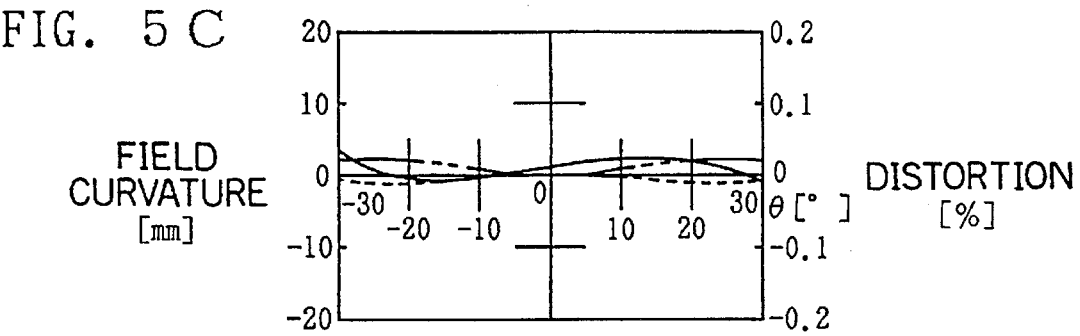

FIGS. 5A to 5C show scanning performances of the scanning lens system (fθ lens) SL' on which a parallel beam is incident. FIG. 5A shows a scanning performance on the image plane 8 obtained when the beam B is deflected from one point of deflection to be incident on the scanning lens SL' without any movement of the point of deflection taken into consideration (this performance will be referred to as "scanning performance without any movement of the point of deflection"). FIG. 5B shows a scanning performance obtained when the beam B from a moving point of deflection $P_3$ (see FIG. 13) is incident by use of the polygonal mirror 5 with an inscribed circle diameter of 30 mm (this performance will be referred to as "scanning performance with a movement of the point of deflection"). FIG. 5C shows a scanning performance obtained when the scanning lens system SL' (lens elements G1 to G3) is decentered by 0.4 mm in the beam incident direction (Δy=−0.4mm).

Figure 13:
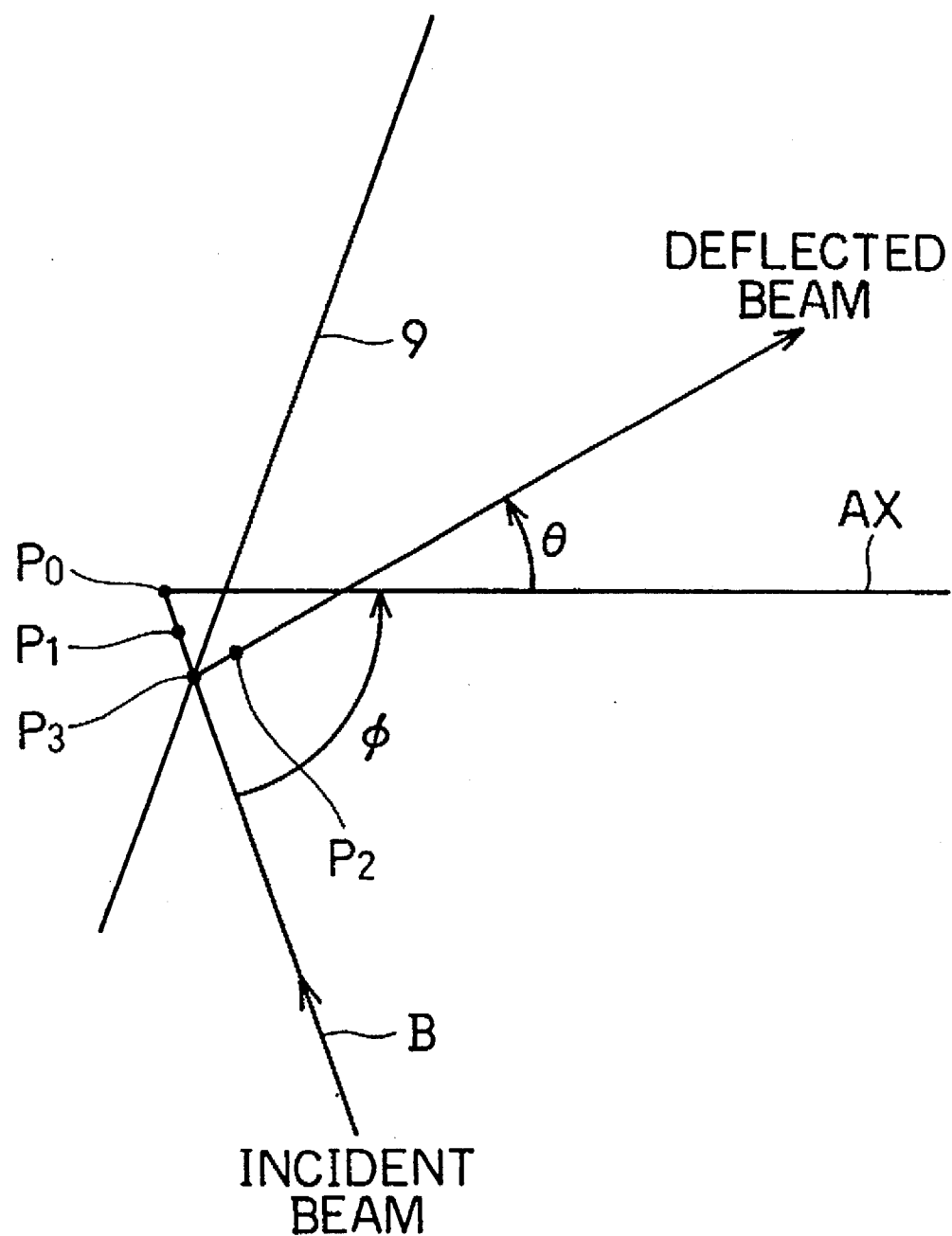
FIG. 13 is a view of assistance in explaining a condition of deflection of a beam relative to a polygonal reflecting surface in the scanning optical system.
Figure 14:
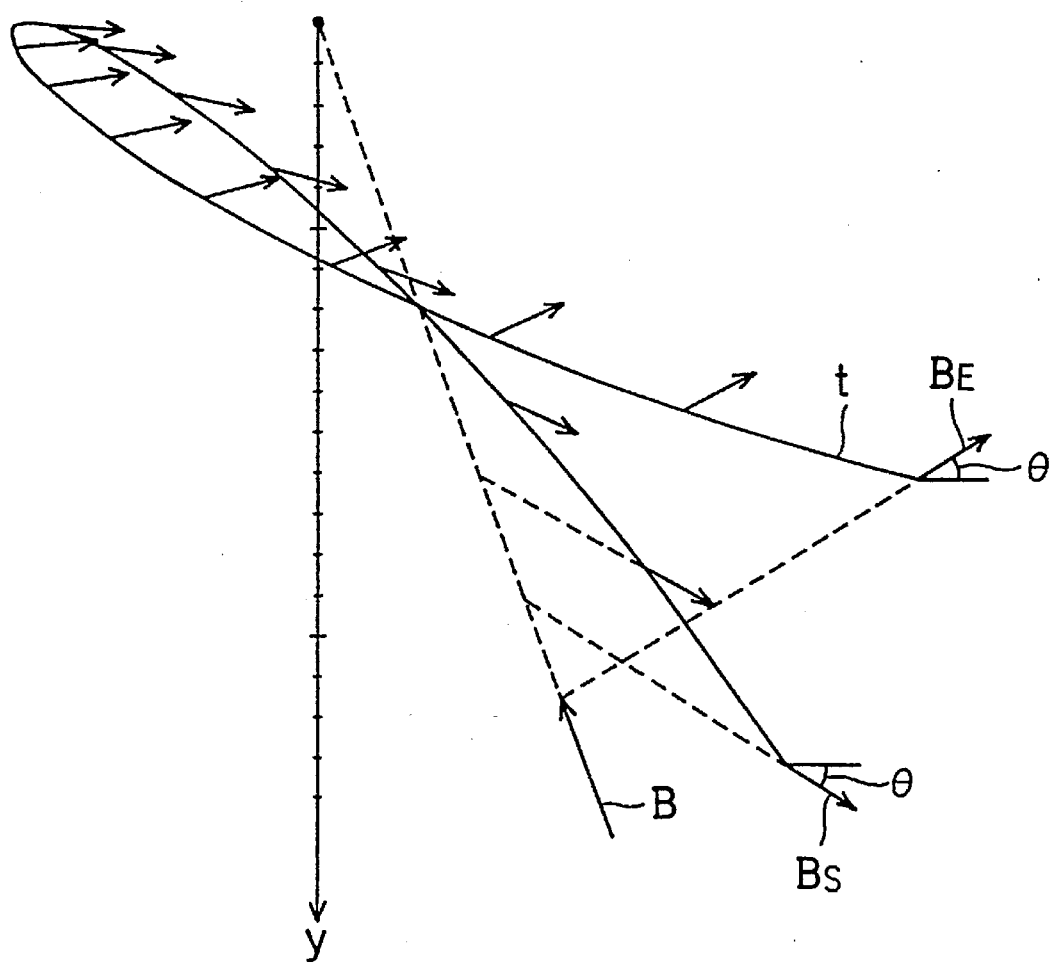
FIG. 14 shows a movement of the point of deflection in the sub scanning direction in the scanning optical system.

The beam B is deflected at a polygonal reflecting surface 9 as shown in FIG. 13. At this time, as the angle of deflection θ varies, the point of deflection in the sub scanning direction moves as shown in FIG. 14. The above-mentioned FIG. 5B shows the scanning performance obtained when the point of deflection is thus moved. In FIG. 13, $P_0$ represents an origin, $P_1$ represents a sub scanning side position of condense of the incident beam, $P_2$ represents an object point in the sub scanning direction, and $P_3$ represents a point of deflection. In FIG. 14, $B_E$ 5 represents a beam at the end of image (EOI), $B_S$ represents a beam at the start of scanning (SOS), and t represent a locus of the object point in the sub scanning direction.

Comparing FIGS. 5A and 5B, it is understood that the scanning performances in the main scanning direction (field curvature in the main scanning direction and distortion) do not vary since as described above, the object point distance in the main scanning direction from the scanning lens system SL' does not vary (i.e. is infinite) whether there is a movement of the point of deflection or not. In the sub scanning direction, however, since the object point is located in the vicinity of the deflecting surface 9, field curvature in the sub scanning direction differs between when there is a movement of the point of deflection and when there is no movement of the point of deflection (see FIGS. 13 and 14).

As shown in FIG. 5B, when the angle of deflection θ is positive, sub scanning direction field curvature in the negative direction is large, and when the angle of deflection θ is negative, sub scanning direction field curvature in the positive direction is large. For this reason, by parallelly decentering the first to third lens elements G1 to G3 in the positive direction as shown in FIG. 5C, the sub scanning direction power of the beam having a positive angle of deflection θ is decreased and the sub scanning direction power of the beam having a negative angle of deflection θ is increased (approximately θ=30°), so that the field curvature in the sub scanning direction is restrained as a whole (i.e. on the entire evaluation surface 8). However, it is apparent that when there is a movement of the point of deflection of the polygonal mirror 5, the scanning performances other than the field curvature in the sub scanning direction is not changed even if the scanning lens system SL' is decentered. The same advantage is obtained by parallelly decentering only the toric surface in the positive direction instead of parallelly decentering the scanning lens system SL'.

Figure 6A:
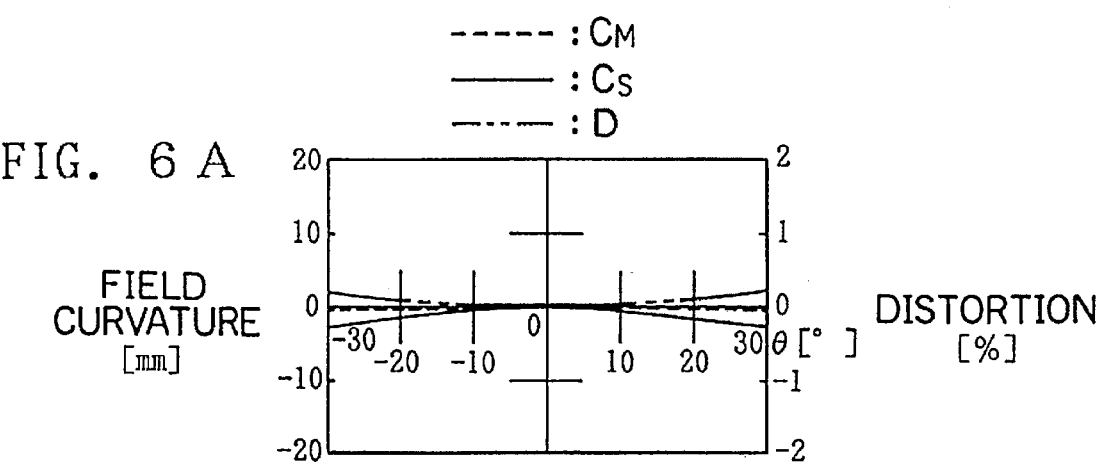
FIGS. 6A and 6B are aberration representations showing scanning performances obtained when there is no decentering in the embodiment of FIG. 1.
Figure 6B:
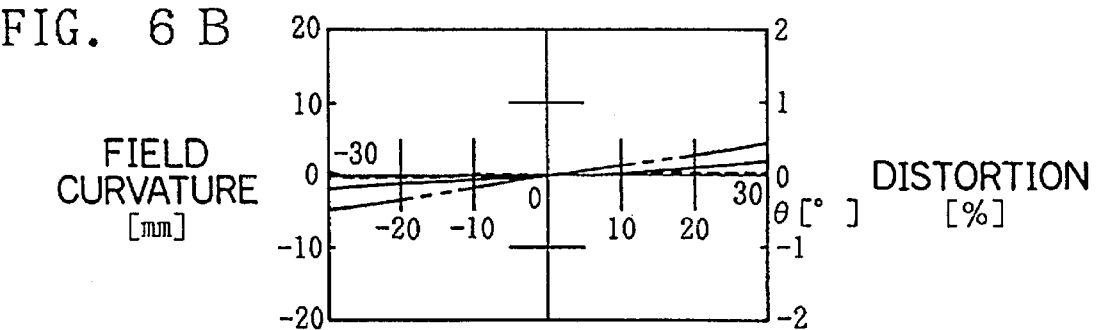

FIGS. 6A to 6B through 10A to 10B and 11 show scanning performances of the scanning lens system SL (Tables 1 and 2) on which a convergent beam is incident, obtained when decentering is provided and when no decentering is provided. FIG. 6A shows a scanning performance obtained when there is no movement of the point of deflection and no decentering is provided. FIG. 6B shows a scanning performance obtained when a polygonal mirror 5 with an inscribed circle diameter φ of 30 mm is used and there is a movement of the point of deflection but no decentering is provided. From FIGS. 6A and 6B, it is apparent that the movement of the point of deflection varies not only the field curvature in the sub scanning direction but also the field curvature in the main scanning direction and distortion. Further, it is apparent that the field curvature in the sub scanning direction and distortion are shifted in the positive direction at a positive angle of view and that distortion is shifted in the negative direction at a negative angle of view.

Subsequently, the variations in behaviors of scanning performances obtained when the scanning lens system SL is decentered (FIGS. 7A to 7A through 10A to 10B) will be described. Here, a decentering to reduce the field curvature in the sub scanning direction and distortion (FIG. 6B) will be approached.

Figure 7A:
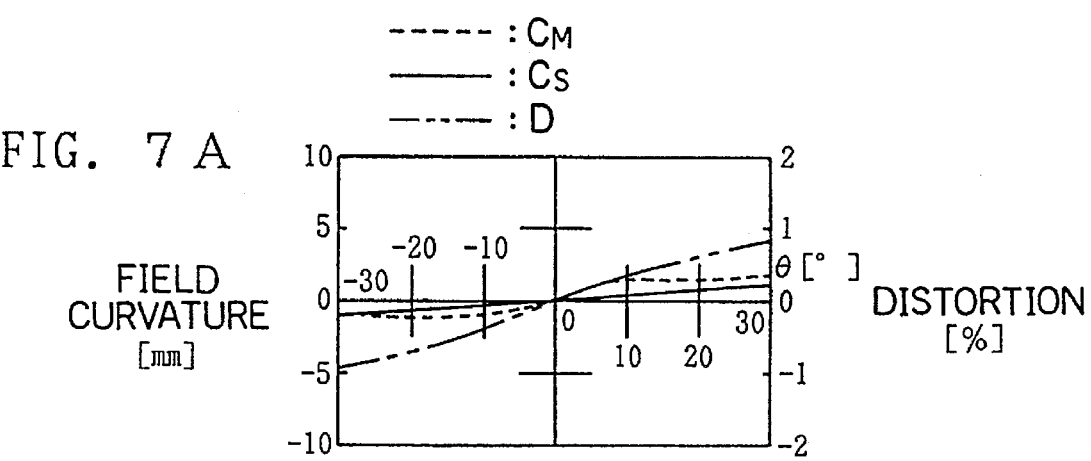
FIGS. 7A and 7B are aberration representations showing scanning performances obtained when only a lens block parallel decentering is performed in the embodiment of FIG. 1.
Figure 7B:
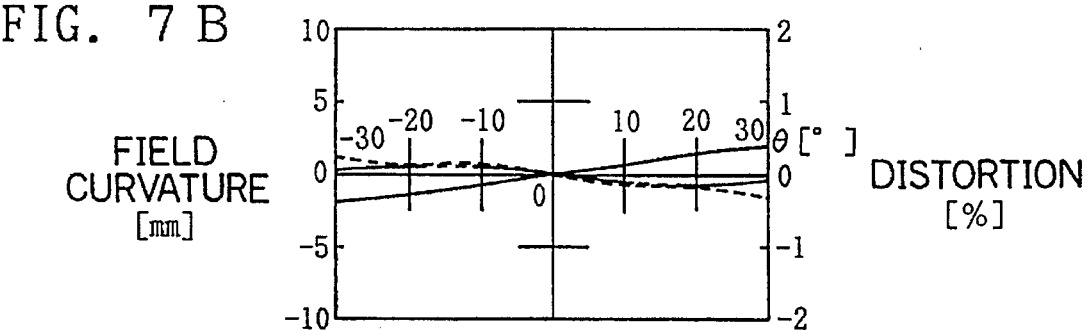
Figure 8A:
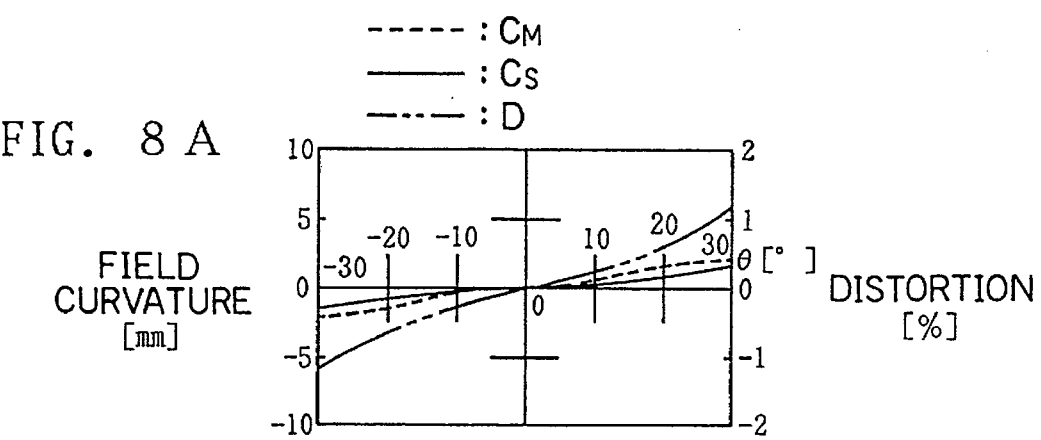
FIGS. 8A and 8B are aberration representations showing scanning performances obtained when only an only surface parallel decentering is performed in the embodiment of FIG. 1.
Figure 8B:
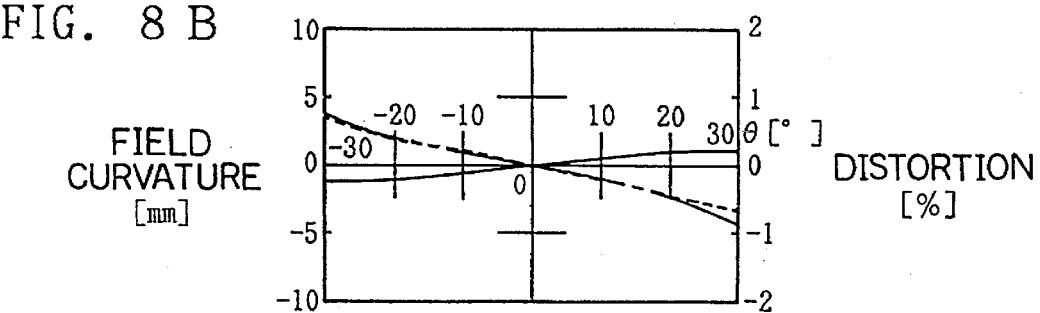

First, the behaviors of scanning performances obtained when parallel decentering is performed will be described. FIGS. 7A and 7B, and 8A and 8B show scanning performances obtained when there is a movement of the point of deflection and shows scanning performances (S1=+210 mm) obtained when the lens block parallel decentering is performed (FIGS. 7A and 7B) and when the only surface parallel decentering is performed (8A and 8B). FIG. 7A shows a scanning performance obtained when the first lens element G1 is lens-block-parallel-decentered by 1 mm in the positive direction (Δy=+1 mm). FIG. 7B shows a scanning performance obtained when the second lens element G2 is lens-block-parallel-decentered by 1 mm in the positive direction (Δy=+1 mm). FIG. 8A shows a scanning performance obtained when the third surface $r_3$ is only-surface-parallel-decentered by 1 mm in the positive direction (Δy=+1 mm). FIG. 8B shows a scanning performance obtained when the fourth surface (toric surface) $r_4$ is only-surface-parallel-decentered by 1 mm in the positive direction (Δy=+1 mm).

As is apparent from FIG. 7A, when the first lens element G1 is lens-block-parallel-decentered, the variation in field curvature in the sub scanning direction is small and the distortion of FIG. 6B is increased by the decentering in the positive direction. As is apparent from FIG. 7B, when the second lens element G2 including the toric surface $r_4$ is lens-block-parallel-decentered, the decentering in the positive direction shifts the distortion of FIG. 6B in a direction to correct it and the decentering in the negative direction shifts the sub scanning direction field curvature in a direction to correct it. However, it is impossible to correct both of the aberrations only by the lens block parallel decentering since the decentering directions to correct the aberrations are opposite to each other.

On the other hand, as is apparent from FIG. 8A, when only the third surface $r_3$ is only-surface-parallel-decentered in the positive direction, both the field curvature in the sub scanning direction and distortion are shifted in a direction to increase. As is apparent from FIG. 8B, when only the fourth surface $r_4$ which is a toric surface is only-surface-parallel-decentered, both the field curvature in the sub scanning direction and the distortion of FIG. 6B can be shifted in a direction to be corrected. However, since the sensitivities are different (i.e. the variation amounts and shift amounts of the aberrations relative to the decentering amount are different from each other), it is impossible to completely correct the aberrations only by this type of decentering.

As described above, in the scanning lens system SL on which a convergent beam is incident, it is impossible to correct both of the field curvature in the sub scanning direction and the distortion as shown in FIG. 6B only by the parallel decentering of the third lens element G3, the parallel decentering of the fourth lens element G4, the parallel decentering of the third surface $r_3$ and the parallel decentering of the fourth surface $r_4$. This can occur in a scanning lens system of the type on which a convergent beam is incident other than the scanning lens system SL of this embodiment.

In the above-described types of parallel decentering and other types of parallel decentering, it is considered to correct aberrations by combining a plurality of types of parallel decentering. However, it is difficult (sometimes impossible) to set the decentering amount, and the only surface decentering increases to increase the number of decentered lenses, so that the cost increases.

Figure 9A:
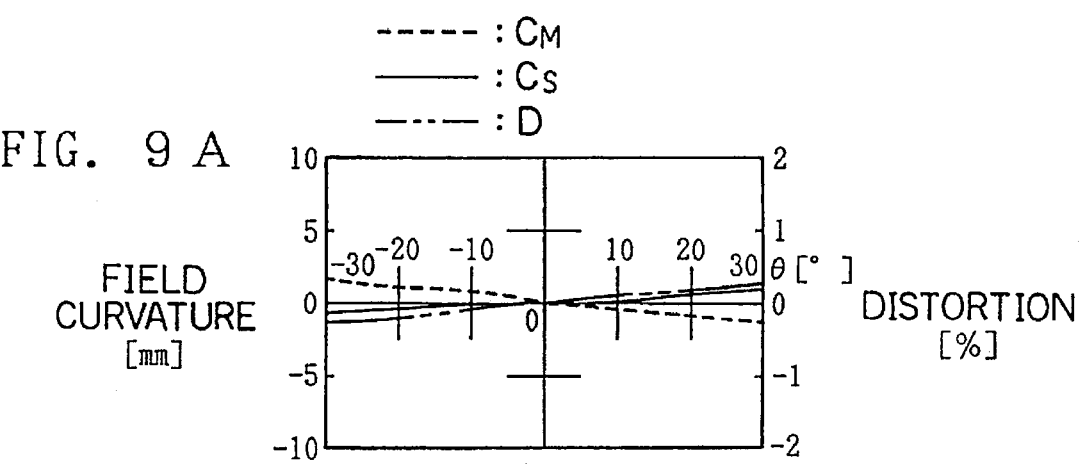
FIGS. 9A and 9B are aberration representations showing scanning performances obtained when only a lens block rotative decentering is performed in the embodiment of FIG. 1.
Figure 9B:
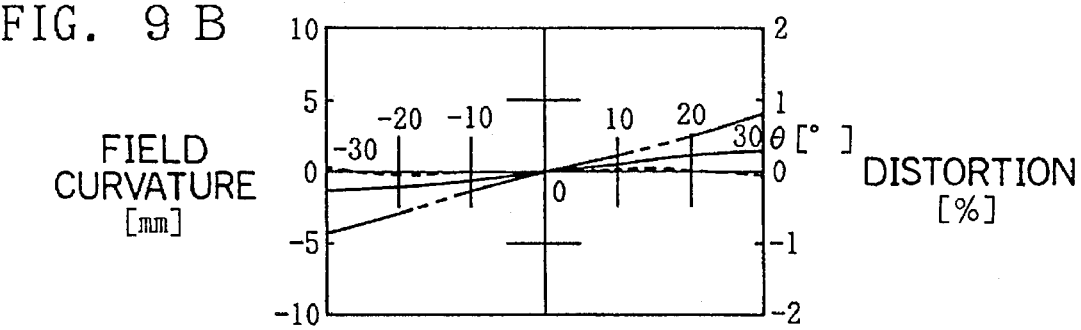
Figure 10A:
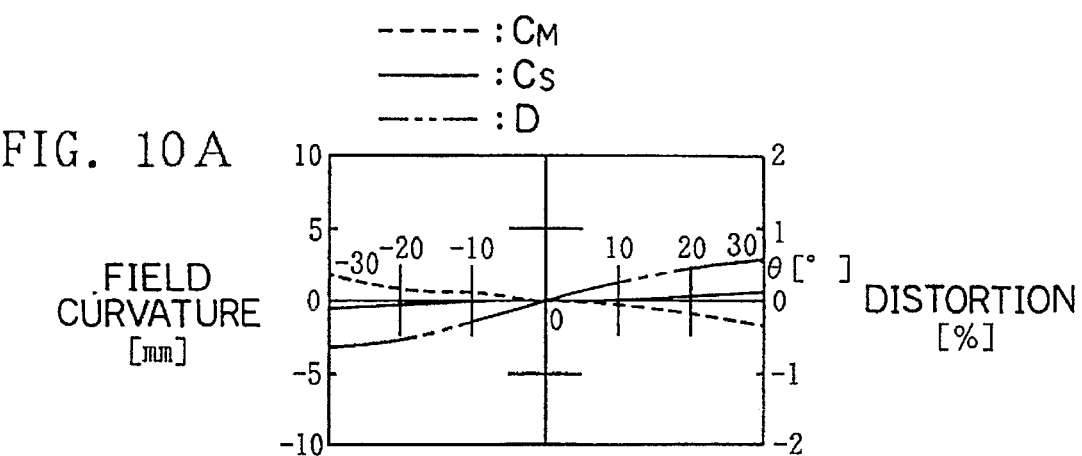
FIGS. 10A and 10B are aberration representations showing scanning performances obtained when only an only surface rotative decentering is performed in the embodiment of FIG. 1.
Figure 10B:
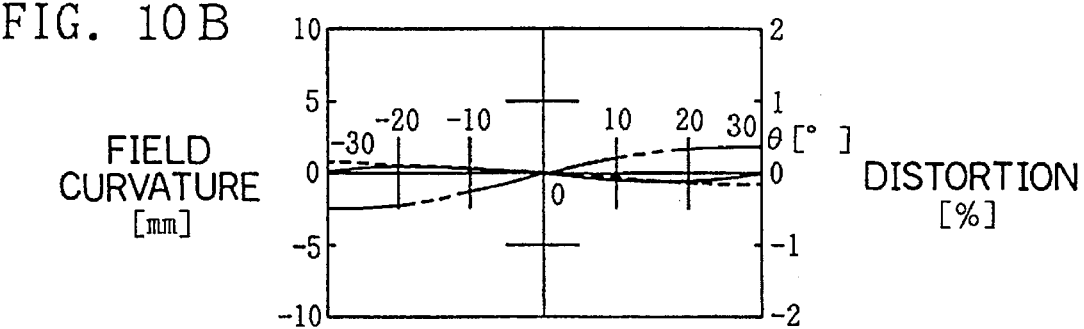
Figure 11:
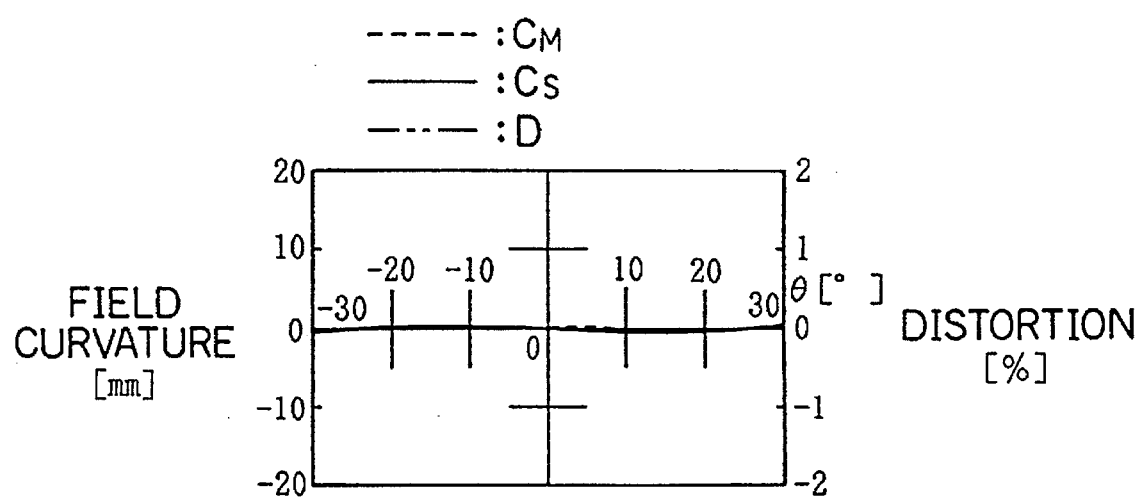
FIG. 11 is an aberration representations showing a scanning performance obtained when the only surface parallel decentering and the lens block rotative decentering are performed in the embodiment of FIG. 1.

Subsequently, the behaviors of scanning performances obtained when rotative decentering about an axis parallel to the sub scanning direction is performed will be described. FIGS. 9A to 9B, and 10A and 10B show scanning performances obtained when there is a movement of the point of deflection and show scanning performances (S1=+210 mm) obtained when the lens block rotative decentering is performed (FIGS. 9A and 9B) and when the only surface rotative decentering is performed (FIGS. 10A and 10B). FIG. 9A shows a scanning performance obtained when the first lens element G1 is lens-block-rotative-decentered about an axis parallel to the sub scanning direction passing the vertex of the first surface of the first lens element G1 ($\Delta\theta_z$=+1°). FIG. 9B shows a scanning performance obtained when the second lens element G2 is lens-block-rotative-decentered about an axis parallel to the sub scanning direction passing the vertex of the third surface $r_3$ ($\Delta\theta_z$=+1°). FIG. 10A shows a scanning performance obtained when the third surface $r_3$ is only-surface-rotative-decentered about an axis parallel to the sub scanning direction passing the vertex of the third surface $r_3$ ($\Delta\theta_z$=+1°). FIG. 10B shows a scanning performance obtained when the fourth surface $r_4$ which is a toric surface is only-surface-rotative-decentered about an axis parallel to the sub scanning direction passing the vertex of the fourth surface $r_4$ ($\Delta\theta_z$=+1°).

Comparing the lens block parallel decentering of the second lens element G2 (FIG. 7B) and the lens block rotative decentering of the second lens element G2 about the axis parallel to the sub scanning direction (FIG. 9B), it is understood that the aberrations are varied in the opposite directions in the former and latter types of decentering. That is, when the second lens element G2 is decentered in a direction to increase the field curvature in the sub scanning direction, in the former type, distortion is shifted in a direction to be corrected, but in the latter type, distortion is shifted in a direction to increase. Conversely, when the second lens element G2 is decentered in a direction to decrease the field curvature in the sub scanning direction, in the former type, distortion is shifted in a direction to increase, and in the latter type, distortion is shifted in a direction to be corrected. Regarding the rotative decentering, it is understood that the variation in distortion is great for the variation in the field curvature in the sub scanning direction. This is remarkable particularly in FIGS. 9A, 10A and 10B.

As described above, the directions and amounts of variations in inclinations of the field curvatures in the main and sub scanning directions and distortion vary according to the type of decentering such as the lens block decentering, the only surface decentering, the parallel decentering and the rotative decentering about the axis parallel to the sub scanning direction. In this embodiment, the present inventors paid attention to the above-described behaviors of variations in the scanning performances caused by the parallel decentering and the rotative decentering about the axis parallel to the sub scanning direction, and utilizes the fact that the rotative decentering of the second lens element G2 about the axis parallel to the sub scanning direction largely varies the distortion compared to the variation in field curvatures in the main and sub directions.

Specifically, as shown in FIG. 1 being enlarged, this embodiment is designed to shift the field curvatures in the main and sub scanning directions in a direction to be corrected by only-surface-parallel-decentering the fourth surface $r_4$ (in the figure, $T_4$ represents the vertex of the fourth surface $r_4$) by 0.1 mm relative to the optical axis AX in the negative direction (Δy=−0.1 mm) and to largely vary distortion in a direction to be corrected while the variation in field curvature is small by lens-block-rotative-decentering the second lens element G2 by 0.9° in the negative direction about the axis parallel to the sub scanning direction passing the vertex $T_3$ of the third surface $r_3$ ($\Delta\theta_z = -0.9°$). From the scanning performance (S1=+210 mm) of this embodiment shown in FIG. 11, it is apparent that the aberrations are excellently corrected. As shown in the above-mentioned FIG. 17, the lens block rotative decentering of the second lens element G2 means a rotative decentering of both surfaces (i.e. the third surface $r_3$ and the fourth surface $r_4$) of the second lens element G2 by $-0.9°$ relative to the optical axis about the axis parallel to the sub scanning direction.

Like in this embodiment, in the finite object point scanning lens system, it is necessary to correct both of the field curvature in the sub scanning direction and the distortion caused by the movement of the point of deflection. When a surface rotatively decentered about the axis parallel to the sub scanning direction is used, even if there is a movement of the point of deflection, the variation in distortion is large compared to the variation in field curvature, so that the distortion is shifted in a direction to be corrected while the variation in field curvature is restrained. Consequently, by employing the rotative decentering which is effective in correcting distortion for a scanning lens system where field curvature has been corrected but distortion remains, distortion is corrected while the variation in field curvature is restrained, so that the aberrations can be both excellently corrected. By combining this surface with a surface parallelly decentered relative to the optical axis AX in the main scanning direction, the field curvatures in the main and sub scanning direction are shifted to be corrected, so that the three aberrations are well-balanced.

lens block rotative decentering of the second lens G2 are performed as described above, which type of decentering should be used depends on the type of the scanning lens system.

As described above, according to the present invention, in a finite object point scanning optical system, by using a surface rotatively decentered about an axis parallel to the sub scanning direction relative to a reference axis passing the center of the main scanning direction scanning width on the scanned surface, three scanning performances, i.e. field curvature in the main scanning direction, field curvature in the sub scanning direction and distortion are excellently corrected.

By combining a surface parallelly decentered in the main scanning direction relative to a reference axis passing the center of the main scanning direction scanning width on the scanned surface and a surface rotatively decentered relative to the reference axis about an axis parallel to the sub scanning direction, the three scanning performances are further excellently corrected and well-balanced.

Obviously, many modifications and variations of the present invention are possible in light of the above teachings. It is therefore to be understood that within the scope of the appended claims, the invention may be practiced other than as specifically described.

While in this embodiment, since the decentering is for the surfaces of the second lens element G2, the optical axis AX of the scanning lens system SL which coincides with the reference axis passing the center of the main scanning direction scanning width on the scanned surface 8 is the central axis of the first lens element G1. In a condition where the entire scanning lens system SL is lens-block-parallel-decentered or lens-block-rotative-decentered, the reference axis of the decentering is a reference axis passing the center of the mains scanning direction scanning width on the scanned surface 8. While in this embodiment, the only surface parallel decentering of the fourth surface $r_4$ and the

TABLE 1

[Construction Data of the Embodiment]

| Name | Surface No. | Paraxial radius of curvature Main scanning direction | Paraxial radius of curvature Sub scanning direction | Surface configuration type | Axial thickness | Refractive index |
|---|---|---|---|---|---|---|
| Polygonal reflecting surface | 0 | ∞ | | — | | |
| G1 (Aspherical lens) | 1 | −43.17 | | Rotationally symmetrical aspherical surface | 26.0 | 1.0000 |
| | 2 | −48.48 | | Rotationally symmetrical aspherical surface | 8.45 | 1.5188 |
| G2 (Extended toric lens) | 3 | −9078.5 | | Rotationally symmetrical aspherical surface | 37.2 | 1.0000 |
| | 4 | −303.34 | −26.17 | Extended y toric surface | 8.6 | 1.5188 |
| Evaluation surface | 5 | ∞ | | — | 142.87 | 1.0000 |

TABLE 2

[Aspherical coefficients of the Embodiment]

| Name | Surface No. | Aspherical coefficients | |
|---|---|---|---|
| G1 | 1 | $C_0 = -0.023161$ | $\epsilon = 1.0000$ |
| | | | $A_8 = -0.51467 \times 10^{-13}$ |
| | | $A_4 = 0.47894 \times 10^{-5}$ | $A_{10} = -0.16200 \times 10^{-14}$ |
| | | $A_6 = 0.53714 \times 10^{-9}$ | $A_{12} = 0.0$ |

TABLE 2-continued

[Aspherical coefficients of the Embodiment]

| Name | Surface No. | Aspherical coefficients | |
|---|---|---|---|
| | 2 | $C_0 = -0.020626$ | $\epsilon = 1.0000$ |
| | | | $A_8 = 0.99634 \times 10^{-15}$ |
| | | $A_4 = 0.47081 \times 10^{-5}$ | $A_{10} = -0.18859 \times 10^{-18}$ |
| | | $A_6 = 0.15067 \times 10^{-9}$ | $A_{12} = 0.0$ |
| G2 | 3 | $C_0 = -0.00011015$ | $\epsilon = 1.0000$ |
| | | | $A_8 = 0.84580 \times 10^{-14}$ |
| | | $A_4 = -0.17366 \times 10^{-6}$ | $A_{10} = 0.15846 \times 10^{-17}$ |
| | | $A_6 = -0.94860 \times 10^{-10}$ | $A_{12} = 0.0$ |
| | 4 | Radius of curvature (paraxial) in sub scanning direction : $1/c = -26.17$ Radius of curvature (paraxial) in main scanning direction: $1/K = -303.34$ Conic constant in sub scanning direction: $\epsilon$ 1.0000 Conic constant in main scanning direction: $\mu = 1.0000$ Torsion parameter of generatrix: $S = 0.0000$ Torsion parameter of generatrix: $1/Cs = \infty$ [Aspherical coefficients in main scanning direction] $a_{0.4} = -0.71212 \times 10^{-6}$ $a_{0.6} = 0.34155 \times 10^{-10}$ $a_{0.8} = -0.30602 \times 10^{-13}$ $a_{0.10} = 0.26748 \times 10^{-17}$ [Aspherical coefficients in sub scanning direction] $a_{2.2} = 0.21000 \times 10^{-5}$ $a_{2.4} = -0.65000 \times 10^{-9}$ $a_{2.6} = -0.42500 \times 10^{-13}$ | |

TABLE 3

[Construction Data of the Comparison]

Paraxial radius of curvature

| Name | Surface No. | Main scanning direction | Sub scanning direction | Surface configuration type | Axial thickness | Refractive index |
|---|---|---|---|---|---|---|
| Polygonal reflecting surface | 0 | ∞ | | — | | |
| G1 | 1 | −371.369 | | Spherical surface | 22.00 | 1.0000 |
| | 2 | 1755.8 | | Spherical surface | 9.50 | 1.51118 |
| G2 | 3 | −69.900 | ∞ | Cylindrical surface | 31.20 | 1.0000 |
| | 4 | −77.900 | −37.760 | Toric surface | 8.00 | 1.51118 |
| G3 | 5 | −1909.8 | | Spherical surface | 0.80 | 1.0000 |
| | 6 | −144.467 | | Spherical surface | 15.00 | 1.78571 |
| Evaluation surface | 7 | ∞ | | — | 317.56 | 1.0000 |

What is claimed is:

1. A scanning lens system which forms a light beam deflected by a deflector into an image on a scanned surface to scan the scanned surface with the light beam, said light beam halving its object point in a main scanning direction located at a finite distance, the scanning lens system comprising:

a first surface which is parallelly decentered in the main scanning direction relative to an axis passing the scanned surface at a center of scanning width in the main scanning direction; and a second surface which is rotatively decentered relative to an axis parallel to subscanning direction.

2. A scanning lens system which forms a light beam deflected by a deflector into an image on a scanned surface to scan the scanned surface with the light beam, said light beam having its object point in a main scanning direction located at a finite distance, the scanning lens system consisting of, from a side of the deflector:

a first lens element having a negative refractive power; and a second lens element having a positive refractive power and having a surface which is rotatively decentered relative to an optical axis of the first lens element about an axis parallel to the subscanning direction.

3. A scanning lens system as claimed in claim 2, wherein a scanned surface side surface of the second lens element is parallelly decentered in the main scanning direction.

4. A scanning lens system as claimed in claim 2, wherein a central axis of-the rotative decentering of the second lens element passes a vertex of a deflector side surface of the second lens element.

5. A scanning lens system as claimed in claim 2, wherein a scanned surface side surface of the second lens element is a toric surface.

6. A scanning lens system which forms a light beam deflected by a deflector into an image on a scanned surface to scan the scanned surface with the light beam, said light beam having its object point in a main scanning direction located at a finite distance, the scanning lens system comprising:

a lens element which is parallelly decentered in the main scanning direction relative to an axis passing the scanned surface at a center of scanned width in the main scanning direction; and a surface which is rotatively decentered relative to an axis parallel to the subscanning direction.

7. A scanning lens system as claimed in claim 6, wherein said surface forms one of the surfaces of said lens element.

8. A scanning lens system which forms a light beam deflected by a deflector into an image on a scanned surface to scan the scanned surface with the light beam, said light beam having its object point in a main scanning direction located at a finite distance, the scanning lens system comprising:

- a surface which is parallelly decentered in the main scanning direction relative to an axis passing the scanned surface at a center of scanned width in the main scanning direction; and
- a lens element which is rotatively decentered relative to an axis parallel to the subscanning direction.

9. A scanning lens system as claimed in claim 8, wherein said surface forms one of the surfaces of said lens element.

10. A scanning lens system which forms a light beam deflected by a deflector into an image on a scanned surface to scan the scanned surface with the light beam, said light beam having its object point in a main scanning direction located at a finite distance, comprising:

said scanning lens system has both a parallely decentered surface relative to an axis passing the scanned surface at a center of scanned width in the main scanning direction and a rotatably decentered surface so as to correct and well-balance field curvature in both the main scanning direction, and the subscanning direction and distortion.

* * * * *